US007574666B2

(12) United States Patent
Miyamoto

(10) Patent No.: US 7,574,666 B2
(45) Date of Patent: Aug. 11, 2009

(54) ELECTRONIC DEVICE AND STORAGE MEDIUM WHICH STORES A DISPLAY CONTROL PROGRAM

(75) Inventor: Kenji Miyamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 753 days.

(21) Appl. No.: 11/163,731

(22) Filed: Oct. 28, 2005

(65) Prior Publication Data

US 2007/0101283 A1 May 3, 2007

(51) Int. Cl.
*G06F 3/048* (2006.01)

(52) U.S. Cl. ....................... 715/769; 715/771; 715/802; 715/841; 715/854

(58) Field of Classification Search ................. 715/769, 715/771, 802, 841, 854
See application file for complete search history.

(56) References Cited

U.S. PATENT DOCUMENTS

| | | | | |
|---|---|---|---|---|
| 5,384,910 | A * | 1/1995 | Torres | 715/810 |
| 5,406,307 | A * | 4/1995 | Hirayama et al. | 715/800 |
| 5,790,122 | A * | 8/1998 | Cecchini et al. | 715/854 |
| 5,917,486 | A * | 6/1999 | Rylander | 715/764 |
| 6,433,801 | B1 * | 8/2002 | Moon et al. | 715/840 |
| 6,678,064 | B2 * | 1/2004 | Bruce | 358/1.12 |
| 6,782,402 | B1 * | 8/2004 | Hidaka et al. | 707/203 |
| 6,976,224 | B2 * | 12/2005 | Nii | 715/769 |
| 2005/0289476 | A1 * | 12/2005 | Tokkonen | 715/769 |

FOREIGN PATENT DOCUMENTS

| | | | |
|---|---|---|---|
| JP | H11/328081 | A | 11/1999 |
| JP | 2004/29350 | A | 1/2004 |
| JP | 2004029350 | A * | 1/2004 |

* cited by examiner

*Primary Examiner*—William L Bashore
*Assistant Examiner*—Gregory A DiStefano
(74) *Attorney, Agent, or Firm*—Global IP Counselors, LLP

(57) ABSTRACT

An electronic device is disclosed that can simultaneously display basic function screens for a plurality of functions, and can also display one of these basic function screens or a lower level screen corresponding to a selection item in the one basic function screen in an enlarged format. When an initial screen is displayed and a selection item in a basic function screen is dragged to a display button, all of the basic function screens will be deleted, and a lower level screen corresponding to the selection item will be displayed in an enlarged format in the display area of a display unit. In addition, when the initial screen is displayed and an area outside the selection item in a basic function screen is dragged to the display button, the basic function screens will be deleted except for the basic function screen whose area was dragged to the display button, and that basic function screen will be displayed in an enlarged format in the display area of the display unit.

3 Claims, 9 Drawing Sheets

ELECTRONIC DEVICE AND STORAGE MEDIUM WHICH STORES A DISPLAY CONTROL PROGRAM

BACKGROUND OF THE INVENTION

1. Field of the Invention

The present invention relates to an electronic device, and more particularly to an electronic device comprising a plurality of functions and having a display. In addition, the present invention relates to a storage medium that stores a display control program for this type of electronic device.

2. Background Information

FIG. 1 shows an example of the initial screen that is displayed on a display device that includes a touch panel, which is arranged on an image forming device (an electronic device such as a copying machine) comprising a copying function, a facsimile function, a scanner function, and a printer function. Four function buttons 101-104 for selecting various functions are aligned and displayed in the front to rear direction on the left side of the display region of the display device. One individual function basic screen 105 that corresponds to the function selected by means of the function buttons 101-104 is displayed on the right side of these function buttons 101-104. In this example, an initial screen that corresponds to the copying function is displayed.

When a user wants to view an individual function basic screen for a function other than the copying function, it will be necessary to switch functions by means of the function buttons 101-104.

In addition, for example, when selection items 106 inside the individual function basic screen that corresponds to the copying function are operated, the individual function basic screen that corresponds to the copying function will be switched to a screen that is one level lower in response to the selection item 106. Thus, only one screen level from amongst each screen level that corresponds to each selection item of the copying function can be displayed at any one time. However, there are also times when a user will want to view two or more screen levels simultaneously.

An object of the present invention is to provide an electronic device that can simultaneously display the individual function basic screens of a plurality of functions, and can display in an enlarged format one of the individual function basic screens, or a screen that is one level lower in response to a selection item inside the one individual function basic screen. Another object of the present invention is to provide an electronic device that can simultaneously display a plurality of screen levels. Yet another object of the present invention is to provide a display control program that is executed in this type of electronic device.

SUMMARY OF THE INVENTION

An electronic device according to a first aspect of the present invention comprises a plurality of functions, a display device, a first means, a second means, a third means, and a fourth means. The first means displays a plurality of basic function screens corresponding to a plurality of functions performed by the electronic device, and a display button, on a display area of a display unit during the display of an initial screen, each basic function screen having a selection item. The second means will delete all basic function screens, and display a screen in an enlarged format in the display area that corresponds to a selection item, when the plurality of basic function screens are displayed in the display area and a selection item in one of the basic function screens is dragged to the display button. The third means will delete all of the basic function screens except for one basic function screen, and display the one basic function screen in the display area in an enlarged format, when the plurality of basic function screens are displayed in the display area and an area outside a selection item in one basic function screen is dragged to the display button.

The electronic device according to a second aspect of the present invention is the electronic device according to the first aspect, and further comprises a fourth means that will replace a first basic function screen with a screen corresponding to a selection item of a second basic function screen, when the plurality of basic function screens are displayed in the display area and a selection item of the second basic function screen is dragged to the first basic function screen.

In a third aspect of the present invention, a storage medium stores a display control program for an electronic device, the display control program causing the electronic device to execute a first step, a second step, and a third step. The first step displays a plurality of basic function screens corresponding to a plurality of functions performed by the electronic device, and a display button, on a display area of a display unit during the display of an initial screen, each basic function screen having a selection item. The second step will delete all basic function screens, and display a screen in an enlarged format in the display area that corresponds to a selection item, when the plurality of basic function screens are displayed in the display area and the selection item is dragged to the display button. The third step will delete all of the basic function screens except for one basic function screen, and display the one basic function screen in the display area in an enlarged format, when the plurality of basic function screens are displayed in the display area and an area outside the selection item in the one basic function screen is dragged to the display button.

According to the present invention, basic function screens for a plurality of functions can be simultaneously displayed, and in addition, one of the plurality of basic function screens or a lower level screen that corresponds to a selection item therein can be displayed in an enlarged format. In addition, according to the present invention, a plurality of screen levels can be simultaneously displayed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

In the present embodiment, the present invention is applied to an image forming device (copying machine) 21 that comprises a copy function, a scanner function, a printer function, and a facsimile function, and will be described below with reference to the figures.

Figure 1:
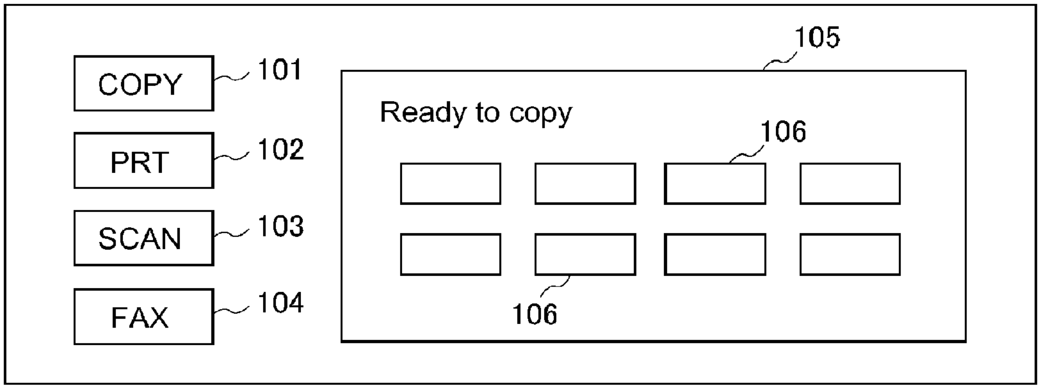
FIG. 1 is a schematic diagram showing an example of an initial screen of a conventional copying machine that is displayed on a display unit having a touch panel.
Figure 2:
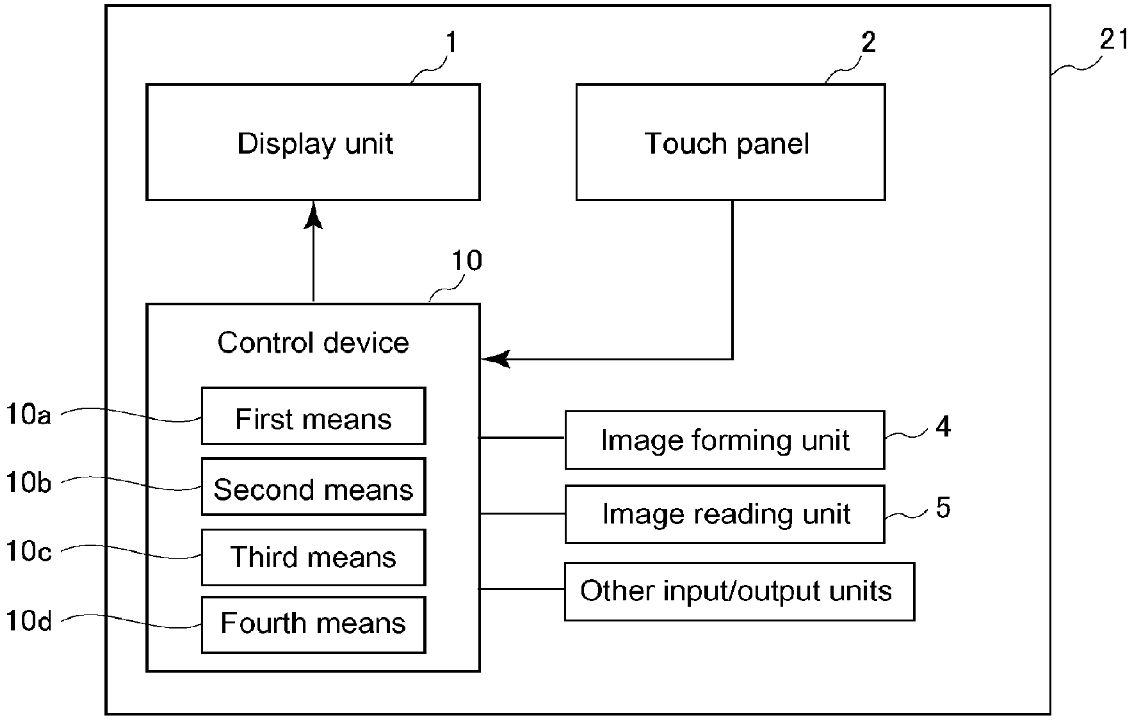
FIG. 2 is a block diagram showing a copying machine that includes a display unit having a touch panel arranged on an operation display unit.

As shown in FIG. 2, the copying machine 21 is comprised of a display unit 1 that includes a touch panel 2 arranged on an operation display unit, a control device 10, an image forming unit 4, an image reading unit 5, and other input/output units. The display unit 1, the touch panel 2, and the other input/output units are respectively connected to the control device 10. The image forming unit 4 serves to form images in accordance with parameters that are set by means of setting operations performed on the operation display unit, and the image reading unit 5 serves to read image data from original documents. Note that the copying machine 21 further comprises a paper transport mechanism (an input/output unit) that transports paper from a paper supply cassette toward the image forming unit and the like.

The control device 10 controls the images displayed on the display unit 1 based upon input signals from the touch panel 2, and functions as a first means 10*a*, a second means 10*b*, a third means 10*c*, and a fourth means 10*d*. In addition, the control device 10 stores display data for the initial screen, each basic function screen, and each screen level that corresponds to each selection item (described below), and can search and call up these screens. Furthermore, the control device 10 controls the operations of the image reading unit 5 and the other input/output units.

Figure 3:
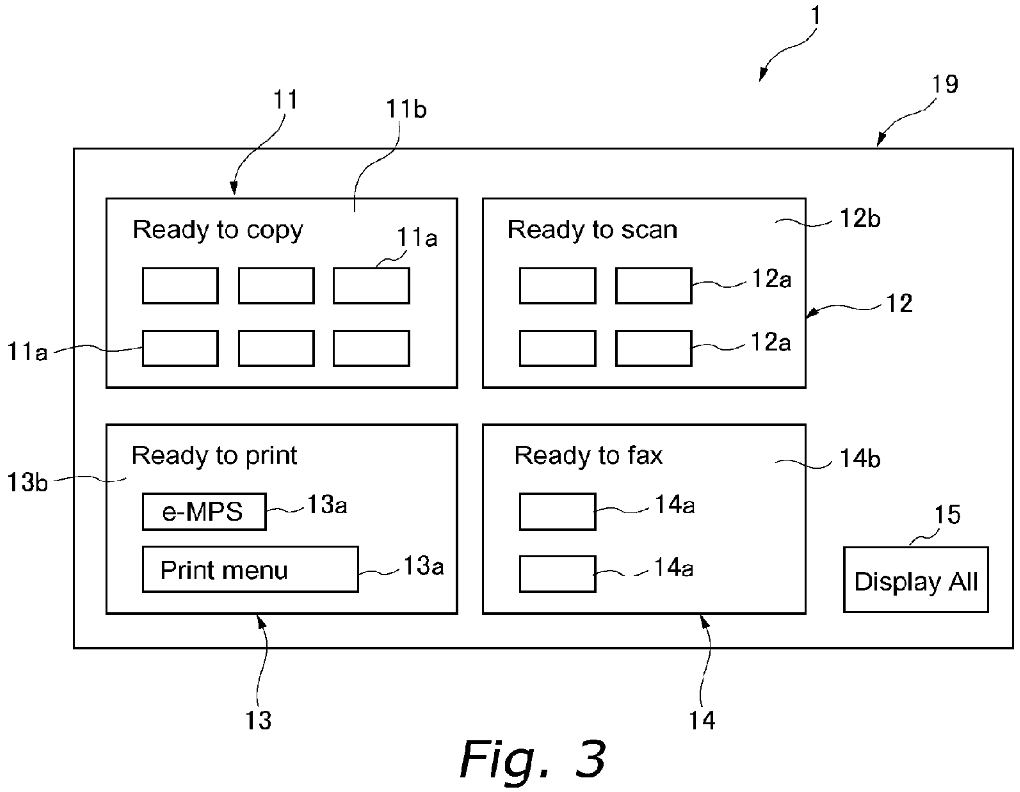
FIG. 3 is a schematic diagram showing an example of an initial screen displayed on the display unit.

FIG. 3 shows an example of an initial screen 19 displayed on the display unit 1. Basic function screens 11-14 for the copying function, the scanner function, the printer function, and the facsimile function, and a "Display All" button 15, are displayed in the display area of the display unit 1.

Each of the basic function screens 11-14 are displayed in the display area of the display unit 1 except on the right side thereof, and the "Display All" button 15 is displayed on the right side of the display area of the display unit 1. The basic function screen 11 corresponding to the copy function is displayed on the upper left side of the display area of the display unit 1 (the basic function screen display area), the basic function screen 12 corresponding to the scanner function is displayed on the upper right side of the basic function screen display area, the basic function screen 13 corresponding to the printer function is displayed on the lower left side of the basic function screen display area, and the basic function screen 14 corresponding to the facsimile function is displayed on the lower right side of the basic function screen display area.

Figure 4:
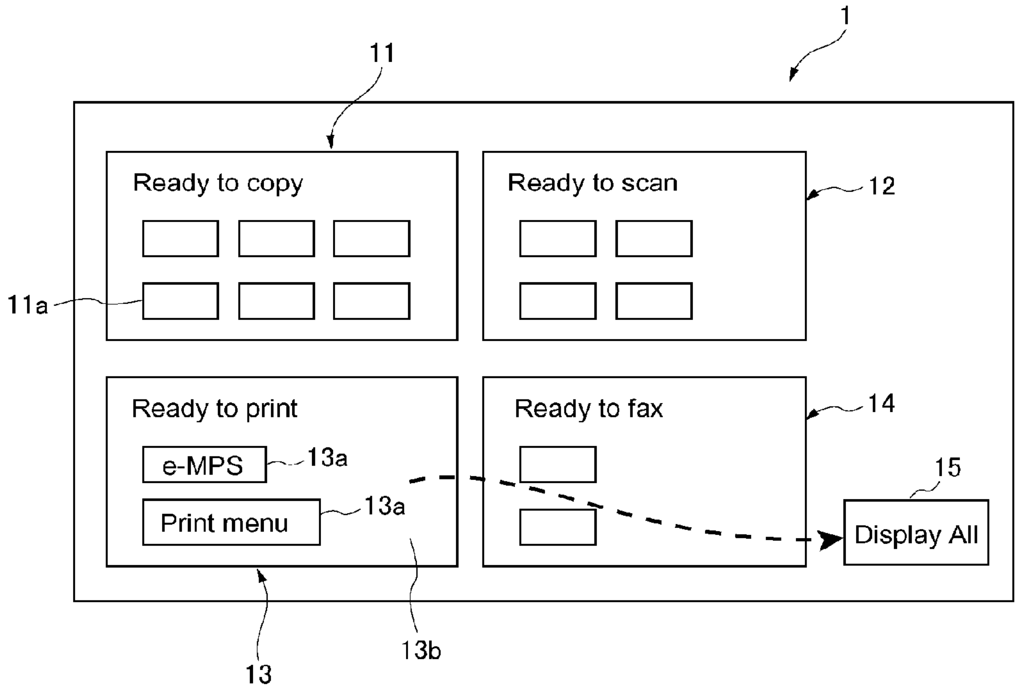
FIG. 4 is a schematic diagram showing an area around the selection items in a basic function screen that corresponds to a printer function being dragged to a "Display All" button.

Selection items 11*a*-14*a*, and areas 11*b*-14*b* around the selection items 11*a*-14*a*, are respectively displayed on basic function screens 11-14. When a user wants to enlarge the display of only one of the four basic function screens 11-14, he or she may drag the area around the selection items inside the basic function screen to the "Display All" button 15, as shown with the arrow in FIG. 4.

Figure 10:
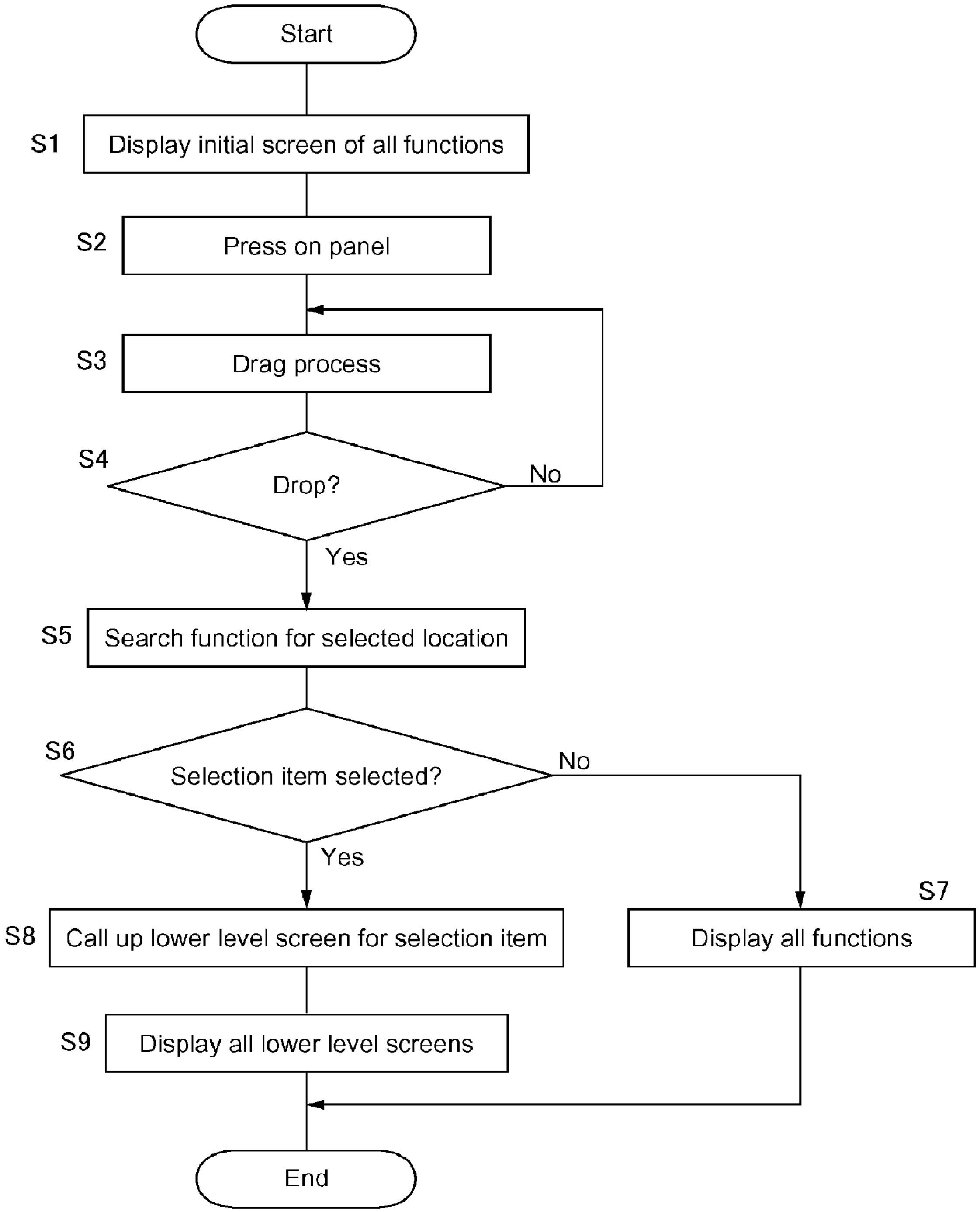
FIG. 10 is a flowchart for describing the display control of the display unit of a copying machine.
Figure 11:
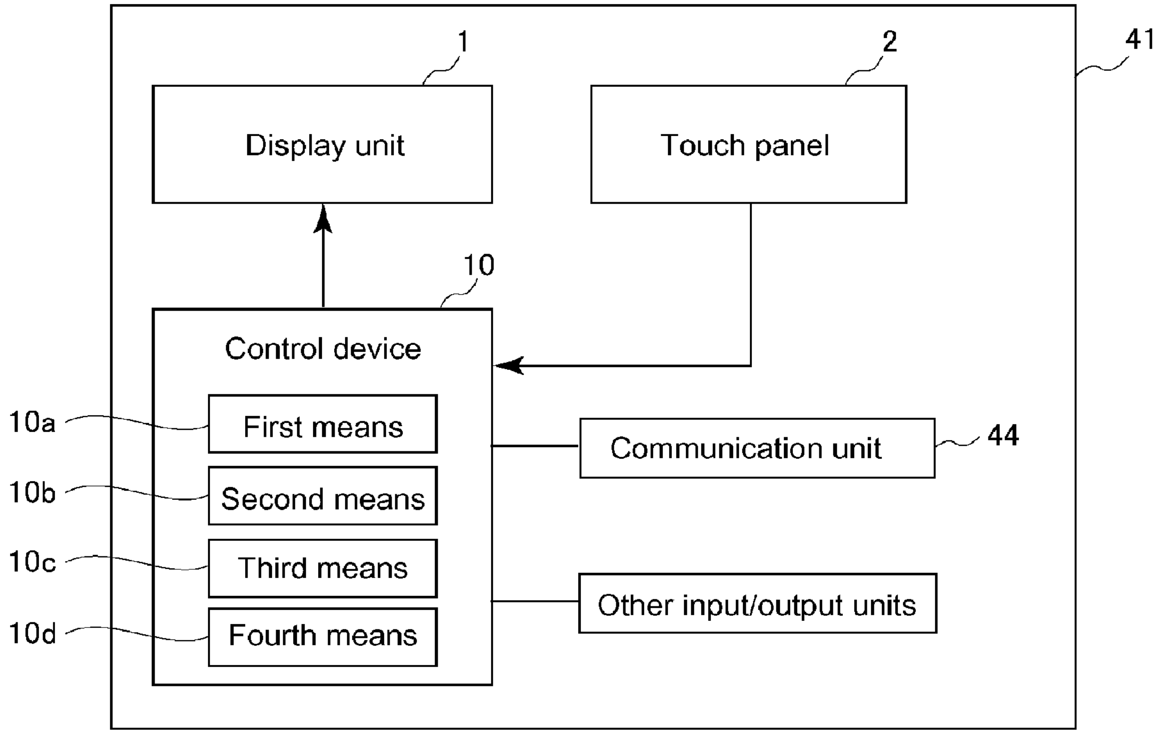
FIG. 11 is a block diagram showing a portable telephone that includes a display unit having a touch panel arranged on an operation display unit of the copying machine.

Details of the display control will be described below with reference to the flowchart of FIG. 10. For example, when a user wants to enlarge the display of the basic function screen 13 corresponding to the printer function when the initial screen 19 is displayed, he or she may press their finger on the area 13*b* around the selection items 13*a* inside the basic function screen 13 of the touch panel 2 (S2), then move their finger to the "Display All" button 15 while pressing on the touch panel 2 (S3), and then release their finger from the touch panel 2 (S4 is YES).

Figure 5:
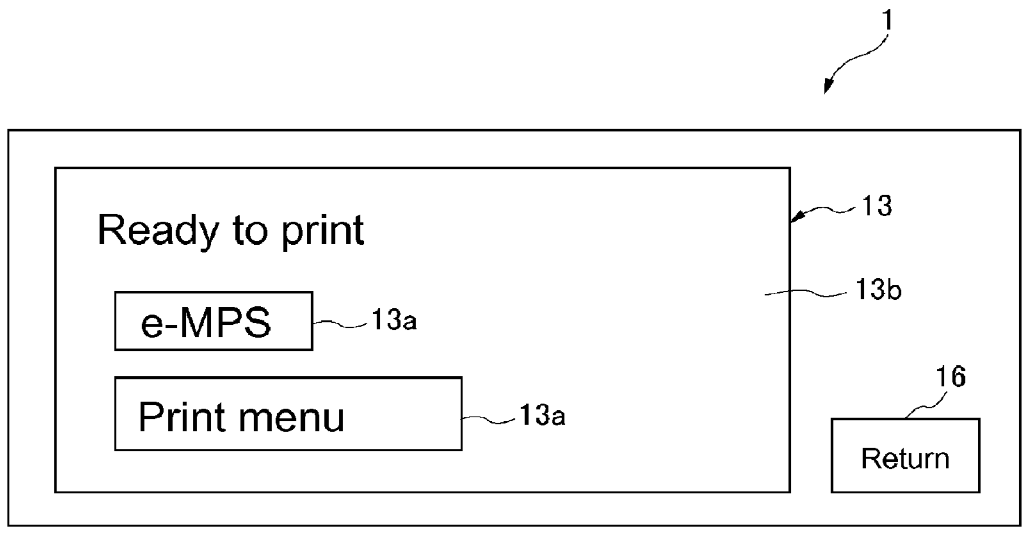
FIG. 5 is a schematic diagram showing an example of a screen displayed on the display unit when the area around the selection items in a basic function screen that corresponds to a printer function is dragged to a "Display All" button.

When this occurs, the area that was pressed in Step S2 will be searched (S5), and as shown in FIG. 5, the basic function screens 11, 12 and 14 will be deleted, the basic function screen 13 will displayed in an enlarged format (S6 is NO, then S7), and then a "Return" button 16 will be displayed. When the "Return" button 16 is pressed, the previously displayed screen, i.e., the initial screen 19 of FIG. 3, will return. Note that when the selection item 13*a* is pressed and selected in the basic function screen 13 displayed in an enlarged format in FIG. 5, the enlarged basic function screen 13 will switch to a screen that is one level lower and that corresponds to the selection item 13*a*. When this occurs, a "Return" button which serves to return to the previous screen, and an "End" button which serves to return to the initial screen 19, will be displayed. Each selection item selected will switch to another screen in the same way as described above.

Figure 6:
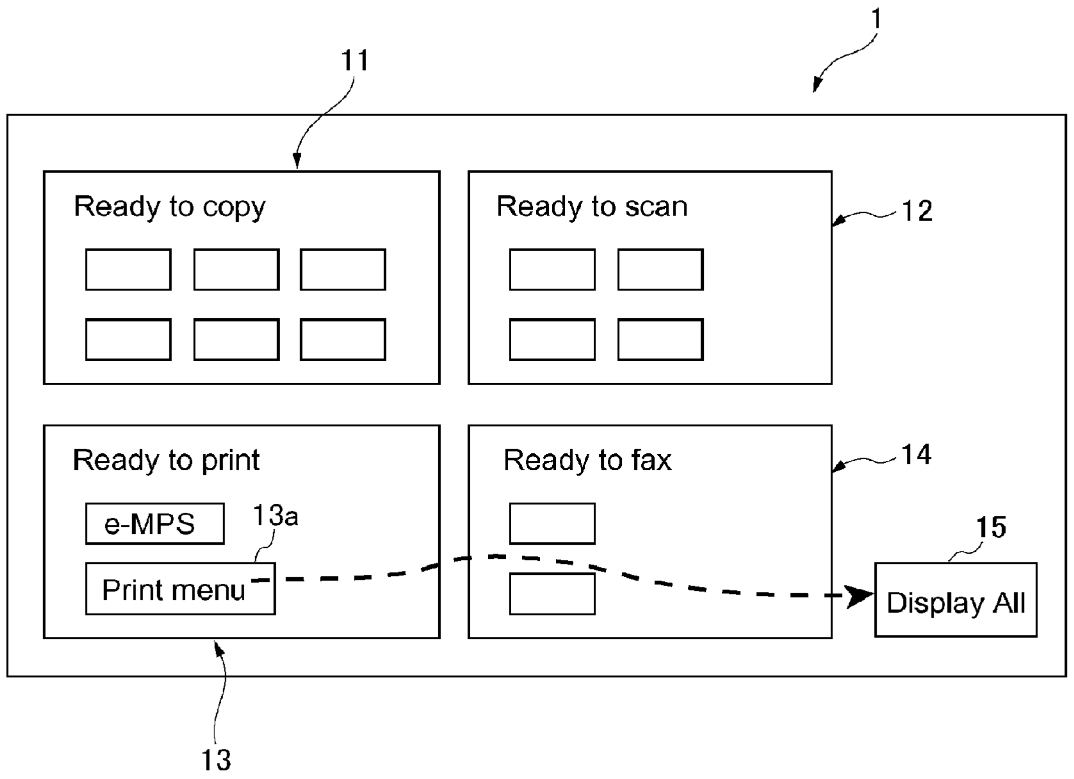
FIG. 6 is a schematic diagram showing a selection item in a basic function screen corresponding to a printer function being dragged to a "Display All" button.

In addition, as shown in FIG. 6, when a user wants to display the lower level screen that corresponds to the selection item 13*a* in the basic function screen 13, he or she may drag the selection item 13*a* in the basic function screen 13 to the "Display All" button 15.

For example, as shown in FIG. 6, when a user wants to display the lower level screen corresponding to the selection item 13*a* in the basic function screen 13 in an enlarged format (e.g., the print menu), he or she may, with the initial screen 19 displayed as shown in FIG. 3 (S1), press the selection item 13*a* on the touch panel 2 with their finger (S2), move their finger while pressed on the touch panel 2 to the "Display All" button 15 (S3), and then release their finger from the touch panel 2 (S4 is Yes).

Figure 7:
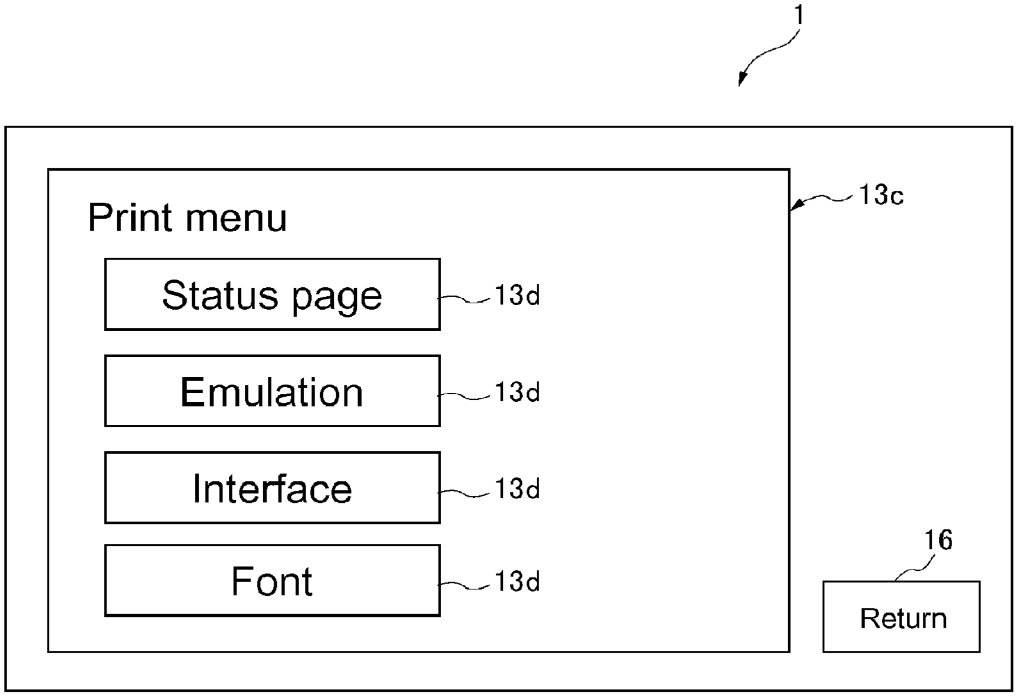
FIG. 7 is a schematic diagram showing an example of a screen displayed on the display unit when a selection item in a basic function screen that corresponds to a printer function is dragged to a "Display All" button.

When this occurs, the area that was pressed in Step S2 will be searched (S5), and as shown in FIG. 7, all of the basic function screens 11-14 will be deleted, the lower level screen corresponding to the dragged selection item 13*a* (the print menu in this example) will be called up (S6 is YES, then S8), the lower level screen will be displayed in an enlarged format (S9), and then the "Return" button 16 will be displayed. When the "Return" button 16 is pressed, the previously displayed screen, i.e., the initial screen 19 of FIG. 3, will return. Note that when the selection item 13*d* in the screen 13*c* is pressed and selected, the screen 13*c* of FIG. 7 will switch to a lower level screen that corresponds to the selection item 13*d*. When this occurs, a "Return" button which serves to return to the previous screen, and an "End" button which serves to return to the initial screen 19, will be displayed. Each selection item selected will switch to another screen in the same way as described above.

Figure 8:
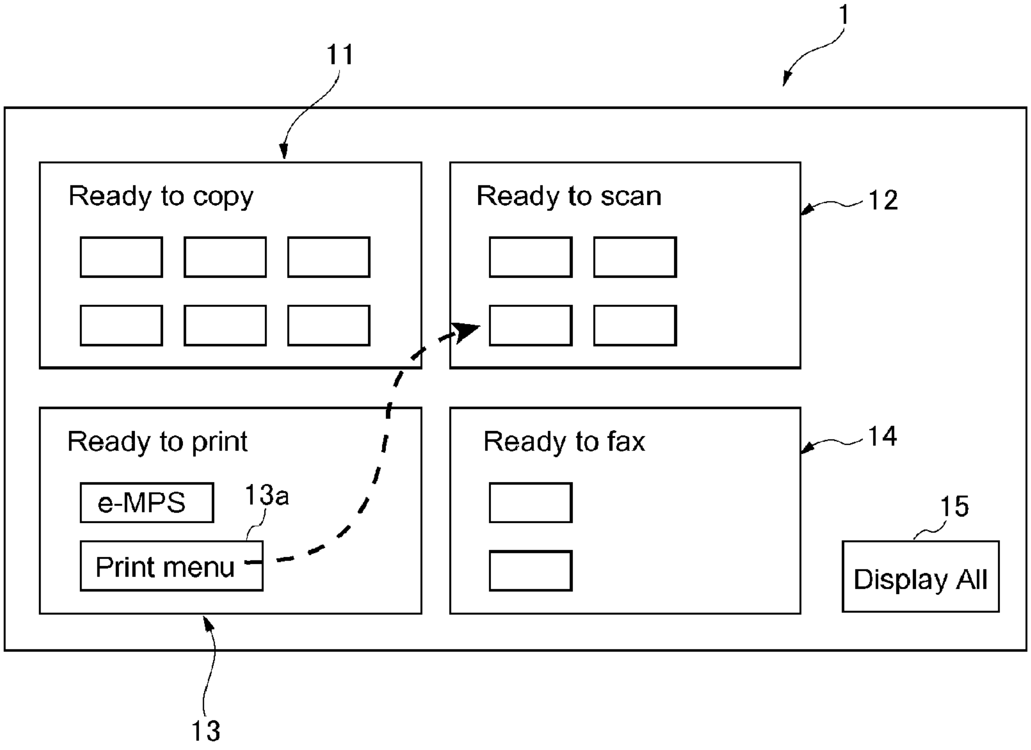
FIG. 8 is a schematic diagram showing a selection item in a basic function screen corresponding to a printer function being dragged to another basic function screen.

Furthermore, when a user wants to switch any of the other basic function screens 12-14 to the lower level screen corresponding to the selection item 13*a* in the basic function screen 13, he or she may, with the initial screen 19 displayed as shown in FIG. 3 (S1), press the selection item 13*a* (the print menu in the example) on the touch panel 2 with their finger as shown in FIG. 8 (S2), move their finger while pressed on the touch panel 2 to another basic function screen (S3), and then release their finger from the touch panel 2 (S4 is Yes).

Figure 9:
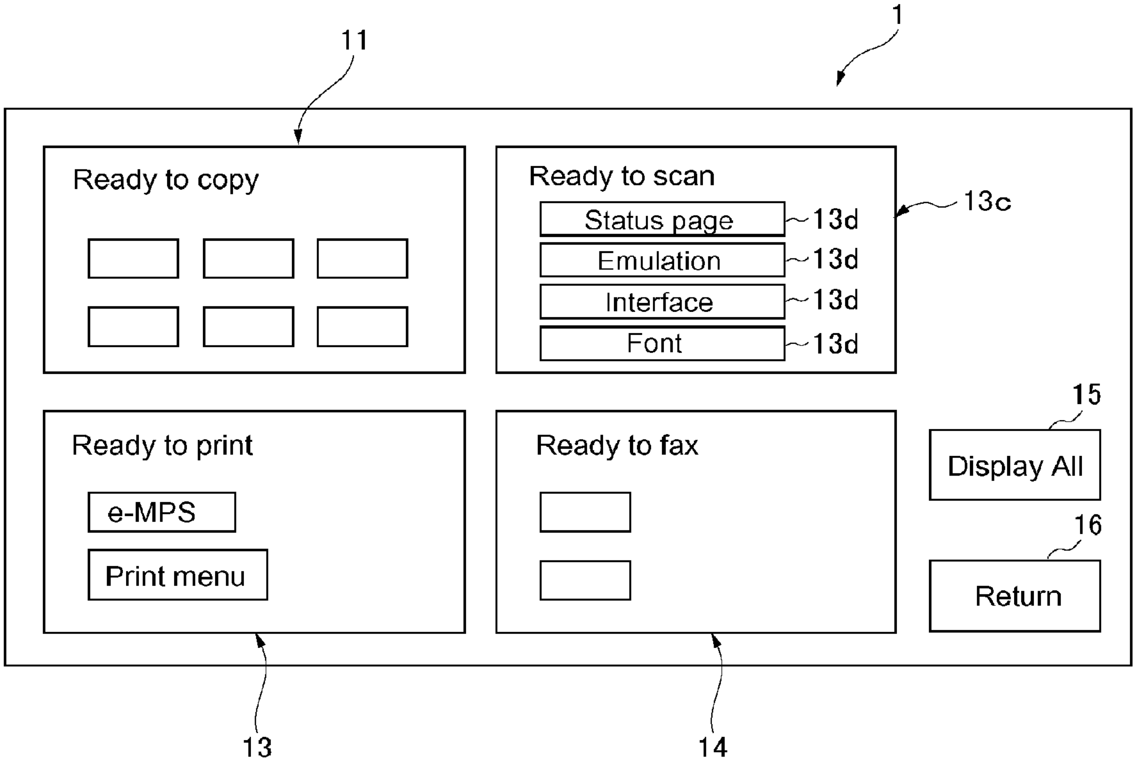
FIG. 9 is a schematic diagram showing an example of a screen displayed on the display unit when a selection item in a basic function screen that corresponds to a printer function is dragged to another basic function screen.

For example, as shown in FIG. 9, when dragged to the basic function screen 12 that corresponds to the scanning function, the lower level screen 13*c* corresponding to the dragged selection item 13*a* (the print menu in this example) will called up, and the basic function screen 12 corresponding to the scanning function will be switched to the lower level screen 13*c* and displayed. In addition, the "Return" button 16 will be displayed together with the "Display All" button 15. By doing this, a plurality of screen levels that correspond to one function can be simultaneously viewed. It is also possible to switch the basic function screen 11 or the basic function screen 14 to the lower level screen corresponding to the selection item in the screen in FIG. 8 by means of the same operation.

In addition, in the screen shown in FIG. 9, it is also possible to replace either of the basic function screens 11, 14 to the lower level screen of a selection item 13*d* by dragging a selection item 13*d* to either of the basic function screens 11, 14, and also possible to display the lower level screen of a selection item 13*d* in an enlarged format by dragging to the "Display All" button 15. Furthermore, by respectively dragging two of the selection items 13*d* in the screen 13*c* to the screens 11, 14, it will also be possible to respectively switch the screens 11, 14 to the lower level screens of the two selection item 13*d* and simultaneously display the same.

Note that the drag operation is not limited to using one's finger, and also includes an operation in which a pen shaped object is used to press on the touch panel. In addition, the initial screen may be displayed in a standby mode such as when waiting for printing to occur, and may be displayed when a predetermined operation is performed in the operation display unit. Furthermore, the present invention can not only applied to a copying machine, but also to other electronic devices such as a portable telephone, a car navigation system device, or the like so long as it is comprised of a plurality of functions and has a display unit. The same effects of the present invention can be obtained as when applied to a copying machine.

Figure 12:
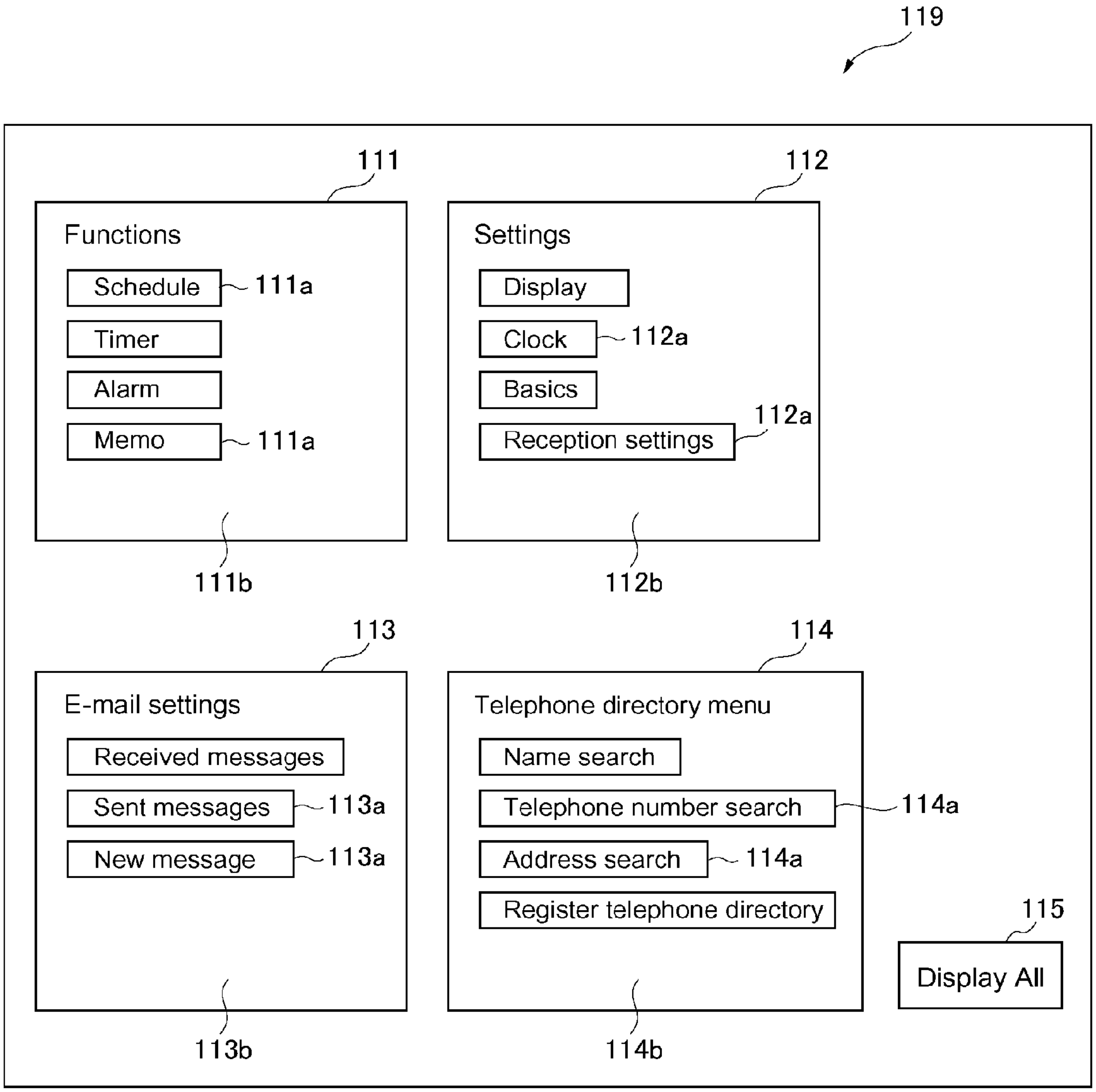
FIG. 12 is a schematic diagram showing an example of an initial screen displayed on the display unit of the portable telephone.

For example, as shown in FIG. 12, a portable telephone 41 to which the present invention has been applied comprises a display unit 1 that includes a touch panel 2 arranged on an operation display unit, a control device 10, a communication unit 44, and other input/output units. The display unit 1, the touch panel 2, the communication unit 44, and the other input/output units are respectively connected to the control device 10. The communication unit 44 is a component for performing voice or text communication with another portable telephone or the like. Note that examples of the other input/output units include a speaker and a microphone used for voice communications and the like.

The control device 10 controls the images displayed on the display unit 1 based on input signals from the touch panel 2, and functions as a first means 10*a*, a second means 10*b*, a third means 10*c*, and a fourth means 10*d*. In addition, the control device 10 stores display data for the initial screen shown in FIG. 12, each basic function screen, and each screen level that corresponds to each selection item, and can search and call up these screens. Furthermore, the control device 10 also controls the operation of the communication unit 44 and the other input/output units.

An initial screen 119 displayed on the display unit 1 of the portable telephone 44 is shown in FIG. 12. Basic function screens 111-114, and a "Display All" button 115, are displayed on the initial screen 119. The basic function screen 111 corresponds to various functions, the basic function screen 112 corresponds to various settings, the basic function screen 113 corresponds to e-mail functions, and the basic function screen 114 corresponds to the telephone directory menu. In addition, selection items 111*a*-114*a* and areas 111*b*-114*b* around the selection items 111*a*-114*a* are respectively displayed in the basic function screen 111-114. The display data for these screens is stored in the control device 10.

Figure 13:
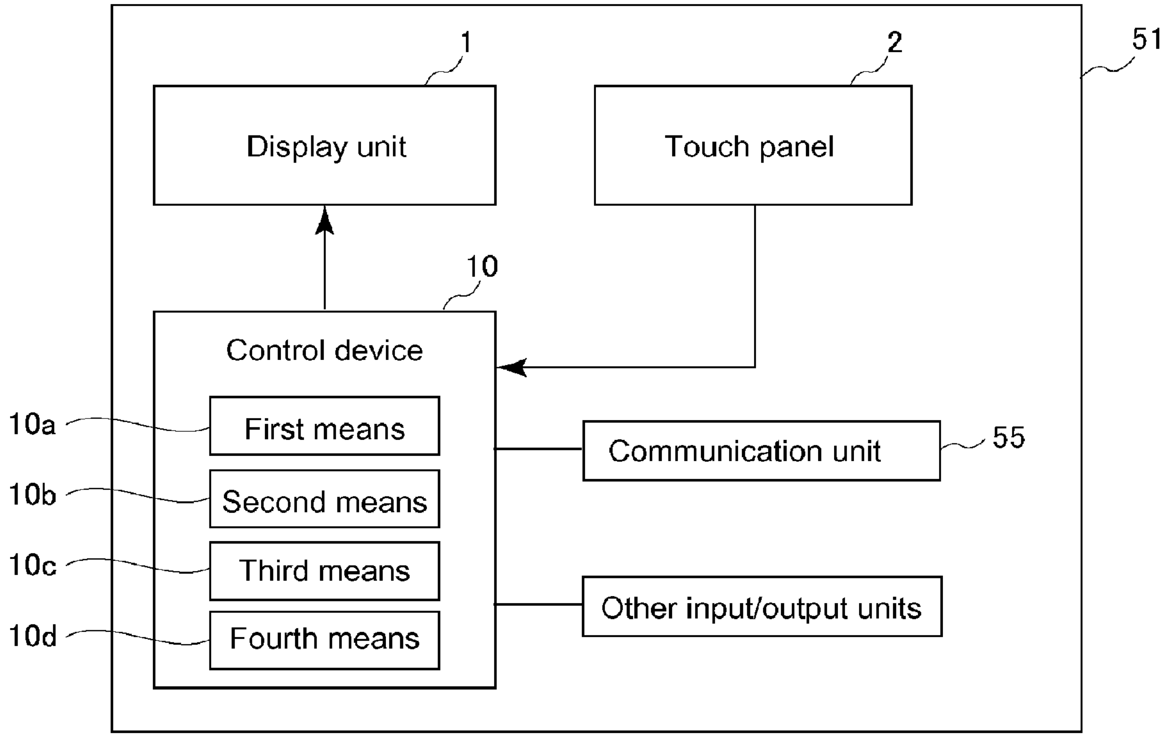
FIG. 13 is a block diagram showing a car navigation system that includes a display unit having a touch panel arranged on an operation display unit.

For example, as shown in FIG. 13, a car navigation system device 51 to which the present invention has been applied is installed and used in a vehicle, and comprises a display unit 1 that includes a touch panel 2 arranged on an operation display unit, a control device 10, a communication unit 55, and other input/output units. The display unit 1, the touch panel 2, the communication unit 55, and the other input/output units are respectively connected to the control device 10. The communication unit 55 serves to receive GPS (Global Positioning System) data generated from predetermined satellites. Note that examples of the input/output units include a disk drive device and the like for driving a CD-ROM and the like on which digital map data is stored.

The control device 10 performs computations in order to display received GPS data on a digital map, controls the images displayed on the display unit 1 based on input signals from the touch panel 2, and functions as a first means 10*a*, a second means 10*b*, a third means 10*c*, and a fourth means 10*d*. In addition, the control device 10 stores display data for a predetermined initial screen, each basic function screen, and each screen level that corresponds to each selection item, and can search and call up these screens. Furthermore, the control device 10 also controls the operation of the communication unit 55 and the other input/output units.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An electronic device, comprising:

a first means that displays a plurality of basic function screens corresponding to a plurality of functions performed by the electronic device, and a display button, on a display area of a display unit during the display of an initial screen, each basic function screen having a selection item;

a second means that will delete all basic function screens, and display a screen in an enlarged format in the display area that corresponds to a selection item, when the plurality of basic function screens are displayed in the display area and the selection item is dragged to the display button; and a third means that will delete all of the basic function screens except for one basic function screen, and display the one basic function screen in the display area in an enlarged format, when the plurality of basic function screens are displayed in the display area and an area outside the selection item in the one basic function screen is dragged to the display button.

2. The electronic device of claim 1, further comprising a fourth means that will replace a first basic function screen with a screen corresponding to a selection item of a second basic function screen, when the plurality of basic function screens are displayed in the display area and a selection item of the second basic function screen is dragged to the first basic function screen.

3. A storage medium that stores a display control program for an electronic device, the display control program causing the electronic device to execute:

a first step that displays a plurality of basic function screens corresponding to a plurality of functions performed by the electronic device, and a display button, on a display area of a display unit during the display of an initial screen, each basic function screen having a selection item;

a second step that will delete all basic function screens, and display a screen in an enlarged format in the display area that corresponds to a selection item, when the plurality of basic function screens are displayed in the display area and the selection item is dragged to the display button; and a third step that will delete all of the basic function screens except for one basic function screen, and display the one basic function screen in the display area in an enlarged format, when the plurality of basic function screens are displayed in the display area and an area outside the selection item in the one basic function screen is dragged to the display button.

* * * * *